Patented July 6, 1954

2,683,183

UNITED STATES PATENT OFFICE 2,683,183

NEGATIVE PLATE PASTE FOR STORAGE BATTERIES

Gilbert F. Hole, Muncie, Ind., assignor to General Motors Corporation, Detroit, Mich., a corporation of Delaware No Drawing. Application October 3, 1952, Serial No. 313,055

6 Claims. (Cl. 136—26)

This invention relates to storage batteries and is particularly concerned with addition agents used in negative plate paste of storage batteries.

The object of the invention is to provide an addition agent for use in a negative plate paste of Faure type storage batteries which will increase the cold discharge rate of the battery.

A further object of the invention is to provide a secondary addition agent to be used in combination with a lignin type of addition agent in negative plate paste, which secondary addition agent either increases or maintains the cold capacities of batteries formed at elevated temperatures.

A still further object is to provide a method for maintaining the efficiency of the storage batteries formed at elevated temperatures whereby the cold discharge rate, for example, is maintained even when the batteries are formed at ambient temperatures in the order of 90° F.

Further objects and advantages of the present invention will be apparent from the following description.

It has long been known that certain addition agents or expanders, as they are sometimes called, are beneficial for increasing the cold discharge rate of a battery when added in small quantities to the negative plate paste thereof. The most useful of these addition agents are formed from wood products, such as wood pulp, wherein the pulp is generally sulphonated or otherwise treated to form sulphonated lignin product of various types. To the material is often added other ingredients. A variety of these addition agents is disclosed in the patents assigned to the assignee of the present invention. For example, Patent No. 2,325,542, wherein the addition agent is a ligno-sulphonic acid and Patent No. 2,436,299, wherein the addition agent is a combination of lignin bearing material with waste sulphite liquor, carbon black and desirable hydroxides which may be used alone or in combination with other agents including nickel salts. In all cases these materials as disclosed herein are derivatives of wood or other lignin bearing plants from which the desirable material may be extracted through various and suitable treatments. In each case the addition agent is used in very small quantities, for example, from .2% to 2% by weight of the plate paste whereupon the addition agent yields greatly improved results in the function of the battery. These results include a marked improvement in the cold discharge rate of the battery. They retard the crystal growth of the lead salts and they make the battery more resistant to overcharge and other conditions which normally reduce the efficiency and life thereof.

In general the great majority of present-day storage batteries include some sort of addition in a negative plate paste derived from a lignin bearing material.

It is known that upon charging of a battery, the temperature of the acid and plates is elevated and during the summer months when the ambient temperature is in excess of 90° F., the battery temperature sometimes runs as high as 165° F. This is particularly important when fast charging methods are used which increase temperatures within the battery over conventional slower methods. One of said fast charging procedures is disclosed in copending application, Serial No. 197,494, now U. S. Patent No. 2,637,836. While this temperature has little effect upon the majority of elements in the battery, it appears to have a marked and deleterious effect upon the addition agent when said agent includes lignin bearing substances. In fact, I have found that where a lignin type of addition agent is used in the negative plate paste a formation temperature in excess of 90° F. (ambient), markedly reduces the efficiency of the addition agent and that temperatures in the order of 140° F. (ambient), practically destroy the efficiency of said addition agent.

Thus, while it is very beneficial to charge at high rates, for reasons set forth in the aforementioned application, the effect of the high temperatures encountered particularly during summer months to some extent nullifies the benefits derived since these high temperatures destroy or partially destroy the efficiency of the addition agent.

This same condition is often present during the summer months when charging at or under normal rates of input, causing a rise of temperature which markedly reduces the efficiency of the addition agent.

I have found that a secondary addition agent used in small quantities will eliminate these past difficulties. The theoretical reason for this improvement is not entirely understood but it is a known fact that when small additions of suitable secondary agents are added to the negative plate paste the deleterious effects of high temperature charging is nullified with respect to the primary addition agent and, the battery, when fully formed, yields the same satisfactory high cold discharge rates regardless of the temperature of formation.

For addition purposes, I have found that various polyhydroxy benzenes when added in quantities of not in excess of .1% of the weight of the plate paste and preferably from about .01% to .06% thereof preserves the efficiency of the lignin bearing expanders under high temperature charging conditions. For this purpose specific polyhydroxy benzenes appear to yield satisfactory results. The most efficient results are obtained with additions of catechol which is an orthodihydroxy benzene. Resorcinol which is a metadihydroxy benzene and hydroquinone which is a paradihydroxy benzene, also function quite well. The trihydroxy benzenes, such as pyrogallol and phloroglucinol, yield improved results but are not as satisfactory as the dihydroxy compounds. In this connection, phenol does not yield comparable results with the polyhydroxy compounds and is therefore not regarded as a satisfactory secondary addition.

The following table shows various tests run on a plurality of batteries wherein varying additions of catechol were used. All the batteries tested were formed at 140° F. The cold discharge rate noted indicates the number of minutes which elapses when a charged battery is discharged at a 300 ampere rate at 0° F. before the voltage drops to one volt per cell. In each test .9% by weight of plate paste of primary expander was present, said primary expander being disclosed in Hindall Patent No. 2,436,299.

| Percent Catechol by weight of Plate Paste | Cold Discharge Rate (min.) |
|---|---|
| None | 2.83 |
| .007 | 2.93 |
| .014 | 3.43 |
| .028 | 3.97 |
| .056 | 4.20 |
| .112 | 4.22 |

From these figures it is apparent that additions of catechol in excess of .112% are of little additional value as evidenced by the leveling off of the cold discharge rate.

Similar results have been obtained using the other polyhydroxy benzenes mentioned. Also, compatible results have been obtained using a variety of different primary expanders than the one mentioned. In other words, the use of any of the five polyhydroxy benzenes noted herein with any suitable primary expander, will improve the cold discharge rate wherein the battery is initially formed under elevated temperature conditions. Thus the use of a secondary addition agent protects and maintains the beneficial effects of a primary addition agent wherein the battery is formed at elevated temperatures.

For practical purposes, I have found that the use of a secondary addition agent is not necessary during cold winter months when the ambient temperature is low, since during this period the internal battery temperature can be controlled to a temperature where the primary addition agent is not deleteriously effected. However, during the hot summer months control of the battery temperature is almost impossible due to the high ambient temperature and thus the secondary addition agent may be used to good effect during this period.

While the embodiments of the present invention as herein disclosed constitute preferred forms, it is to be understood that other forms might be adopted.

What is claimed is as follows:

1. A negative plate paste comprising the combination lead derivatives, a primary expander including as one of its major constituents a material formed from a lignin bearing compound and a secondary expander consisting of a polyhydroxy benzene taken from the class consisting of dihydroxy and trihydroxy benzenes.

2. A negative plate paste as claimed in claim 1 wherein the polyhydroxy benzene is catechol.

3. A negative plate paste as claimed in claim 1 wherein the polyhydroxy benzene is resorcinol.

4. A negative plate paste as claimed in claim 1 wherein the polyhydroxy benzene is pyrogallol.

5. A negative plate paste as claimed in claim 1 wherein the polyhydroxy benzene is phloroglucinol.

6. A negative plate paste as claimed in claim 1 wherein the polyhydroxy benzene is hydroquinone.

References Cited in the file of this patent

UNITED STATES PATENTS

| Number | Name | Date |
|---|---|---|
| 2,514,415 | Rasch | July 11, 1950 |